Jan. 14, 1941.  W. F. HOLZHAEUSER  2,228,827
PIPE FITTING NIPPLE HOLDER
Filed June 23, 1939
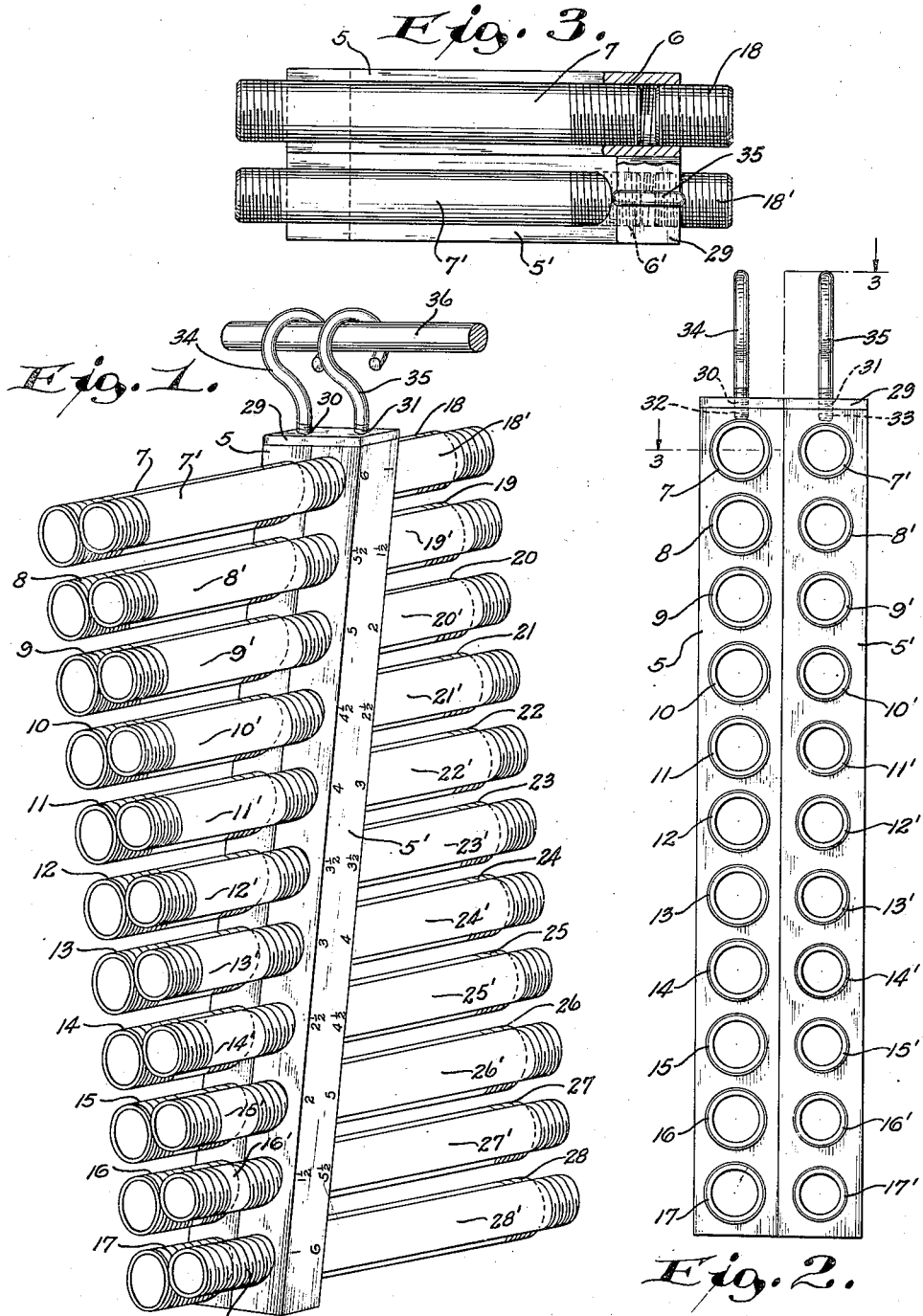
INVENTOR
William F. Holzhaeuser,
BY
Morsell, Lieber & Morsell
ATTORNEYS.

Patented Jan. 14, 1941

2,228,827

UNITED STATES PATENT OFFICE 2,228,827

PIPE FITTING NIPPLE HOLDER

William F. Holzhaeuser, Milwaukee, Wis.

Application June 23, 1939, Serial No. 280,701

3 Claims. (Cl. 211—60)

This invention relates to improvements in pipe fitting nipple holders, and more particularly to a portable rack suitable for removably holding and displaying pipe fitting nipples of assorted sizes.

Heretofore, in plumbing and hardware shops, it has been the practice to store pipe fitting nipples haphazardly in boxes or similar containers. When the workman goes to a location to make an installation or at the shop it is very inconvenient and practically impossible, with the prior practice, to segregate and maintain the pipe fitting nipples in a classified order or arrangement. The shopkeeper or the workman may, for instance, require a pipe fitting nipple of a certain size and after searching through the container it will then be discovered that there are no pipe fitting nipples of the desired size in stock. The present invention aims at a device which will effectively eliminate the above objections and difficulties and which will enable a shopkeeper to have available and in a visible position a complete assortment of pipe nipple fittings of all of the desired sizes.

A further object of the invention is to provide a pipe fitting nipple holder which removably supports a plurality of pipe fitting nipples of assorted sizes and which holder may be supported in a convenient visible position in a shop or which may be removed and transported by the workman to the location of the job.

A further object of the invention is to provide an assorted pipe fitting nipple holder which immediately makes it apparent when a nipple of a certain size has been taken therefrom so that it may be replaced by another in stock.

A further object of the invention is to provide a pipe fitting nipple holder which removably holds pairs of pipe fitting nipples of graduated and assorted sizes, maintaining the same in a neat and compact bundle.

A further object of the invention is to provide assorted pipe fitting nipple holders which may be secured together and supported or transported in gangs.

A further object of the invention is to provide an assorted pipe fitting nipple holder which is of very simple construction, is strong and durable, is inexpensive to manufacture, is neat and attractive in appearance, which permits easy removal and replacement of pipe fitting nipples, and which is well adapted for the purposes described.

With the above and other objects in view the invention consists of the improved pipe fitting nipple holder, and its parts and combinations, as set forth in the claims and all equivalents thereof.

In the accompanying drawing in which the same reference characters indicate the same parts in all of the views:

Fig. 1 is a perspective view of a pair of secured-together pipe fitting nipple holders in which are mounted pipe fitting nipples of graduated and assorted sizes, said pair of secured-together holders being depended from a support;

Fig. 2 is a front view of the pair of secured-together holders shown in Fig. 1; and Fig. 3 is a top view thereof partly broken away and in section, taken on line 3—3 of Fig. 2.

Referring now more particularly to the drawing it will appear that an improved pipe fitting nipple holder consists of an elongated metallic bar 5 of rectangular form in transverse section and having beveled or inclined upper and lower ends.

The bar 5 has a plurality of openings 6 tapped therethrough transversely or from side to side and each opening 6 is internally threaded with the threads extending inwardly from each side or end of the opening. The various openings are equally spaced from one another throughout the length of the bar 5.

Each of the tapped openings 6 engages, on opposite sides of the bar, the inner threaded ends of a pair of complementary pipe fitting nipples. Extending downwardly with respect to the bar 5 the various pairs of nipples thus supported are of graduated sizes. For instance, at the uppermost end of the bar 5 a six inch nipple and a one inch nipple are supported. Immediately therebelow a five and one-half inch and a one and one-half inch nipple are supported and progressively the nipples on one side of the bar are of decreased lengths and the nipples on the other side of the bar are of increased lengths. This means that the marginal edges of the entire assembly will be uniform and that the holder engages two of each specified type of pipe fitting nipples.

In the drawing the nipples supported on one side of the bar from the top to the bottom, of gradually decreasing lengths, are indicated by the numerals 7 to 17 inclusive. The nipples on the other side of the bar complementary respectively to the nipples 7 to 17 inclusive are of gradually increasing lengths and are indicated by the numerals 18 to 28 inclusive.

One face of the bar 5 and in positions adjacent the various tapped openings 6 bears numerical designations of the length of the pipe fitting nipples engaged by the various threaded openings of the bar.

In the drawing there is shown associated with the holder or bar 5 a similar holder or bar 5'. This bar is likewise formed, throughout its length, with internally threaded tapped openings 6' for the reception of the inner ends of complementary pipe fitting nipples. In the bar 5' the tapped openings 6' may be of diameters larger or smaller than the diameters of the tapped openings 6 in the bar 5. Said openings receive nipples of corresponding diameters but the lengths of the nipples remain the same as those carried by the corresponding openings in the bar 5. The pipe fitting nipples of decreasing length carried by the bar 5' are indicated by the numerals 7' to 17' inclusive and the complementary nipples carried by the other side of the bar 5' and of gradually increasing length are designated by the numerals 18' to 28' inclusive.

By providing several holders or bars 5, 5', etc., the worker or shop is insured of having on hand not only a complete assortment of pipe nipples of graduated lengths but also a complete assortment of graduated length nipples of various diameters. It may furthermore be desirable to support or transport several of the holders or bars and for this purpose the arrangement shown in the drawing is provided. It will be observed that a pair of bars 5 and 5' may have adjacent inner faces of the same disposed in contact and a plate 29 is extended across the top faces of the bars 5 and 5'. Said plate is provided with a pair of spaced tapped openings 30 and 31 adapted to register with tapped openings 32 and 33 in the upper ends of the bars 5 and 5'. The threaded shanks of hook members 34 and 35 are then extended into the plate openings 30 and 31 respectively and the bar openings 32 and 33, thereby firmly attaching the plate to the adjacent upper ends of the bars and anchoring the bars together. In a shop a pair of the holders thus secured together may be suitably suspended from a rod 36 or other supporting means. As thus supported the nipple holders will be in a readily visible position to display the assortment of nipples held thereby. Due to the graduated lengths of the nipples the joined bars 5 and 5' will hang in a more or less diagonal or inclined position and this will cause the entire assembly to have a more or less uniform rectangular contour.

If a workman leaves the shop to proceed to the site of a job it is merely necessary for him to remove the holders from the supporting means 36 and to carry with him the convenient group of assorted pipe nipples. If, at the job or at the shop one or more pipe nipples of desired sizes are removed from the holders their absence is readily apparent and noticeable and they should be replaced from stock by the same sized nipples, thereby insuring a constant supply of assorted nipples in the holders available for efficient use at all times.

From the foregoing description it will be apparent that the improved pipe fitting nipple holder is of simple and novel construction and is well adapted for the purposes set forth.

What is claimed as the invention is:

1. As a new article of manufacture, a pipe fitting nipple holder consisting of an elongated rigid member having series of longitudinally spaced internally threaded sockets extending thereinto from opposite faces of said member, the mouths of each pair of sockets being adapted to removably receive the inner threaded ends of a pair of complementary pipe fitting nipples, said rigid member extending in a diagonal relative to the outline of the group of nipples carried thereby.

2. In combination, a pair of laterally adjacent pipe fitting nipple holders, each holder consisting of an elongated bar having longitudinally spaced tapped openings extending transversely therethrough with each opening having entrances on opposite faces of the bar, the openings in one bar being of a diameter different from those in the other bar, each pair of opposite openings in a bar being adapted to receive a pair of complementary pipe fitting nipples, means for detachably joining the bars in their laterally adjacent relation, and means for supporting the pair of bars.

3. In combination, a pair of laterally adjacent pipe fitting nipple holders, each holder consisting of an elongated bar having longitudinally spaced openings extending inwardly from opposite faces of the bar, the openings in one bar being of a diameter different from those in the other bar and being adapted to receive complementary pipe fitting nipples, and common means for detachably joining the bars at their upper ends and for depending the same from a support.

WILLIAM F. HOLZHAEUSER.